US012720292B2

(12) United States Patent
Punithavel et al.

(10) Patent No.: US 12,720,292 B2
(45) Date of Patent: Aug. 25, 2026

(54) METHODS AND APPARATUS FOR SMART WIFI REATTACHMENT

(71) Applicant: Charter Communications Operating, LLC, St. Louis, MO (US)

(72) Inventors: Rohith Kumar Punithavel, Englewood, CO (US); Mohamed Daoud, Aurora, CO (US); Hany Heikal, Aurora, CO (US); Hossam Hmimy, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 339 days.

(21) Appl. No.: 18/414,556

(22) Filed: Jan. 17, 2024

(65) Prior Publication Data

US 2025/0234178 A1 Jul. 17, 2025

(51) Int. Cl.
*H04W 8/00* (2009.01)
*H04W 36/32* (2009.01)
*H04W 76/10* (2018.01)
*H04W 84/12* (2009.01)

(52) U.S. Cl.
CPC ......... *H04W 8/005* (2013.01); *H04W 36/324* (2023.05); *H04W 76/10* (2018.02); *H04W 84/12* (2013.01)

(58) Field of Classification Search
CPC ... H04W 8/005; H04W 36/324; H04W 76/10; H04W 84/12
See application file for complete search history.

(56) References Cited

U.S. PATENT DOCUMENTS 8,385,988 B2 * 2/2013 Bakthavathsalu ........................... H04W 52/0254 455/574
10,171,938 B2 1/2019 Partheesh et al.
2004/0165563 A1 * 8/2004 Hsu ....................... H04W 48/18 370/338
2004/0205158 A1 * 10/2004 Hsu ....................... H04W 48/18 709/227
2011/0182273 A1 * 7/2011 George ......... H04W 36/008375 370/352
2015/0350990 A1 * 12/2015 Fujishiro ............... H04W 4/027 370/331
2019/0098481 A1 * 3/2019 Thota .................... H04W 48/20

FOREIGN PATENT DOCUMENTS

EP 3349512 A1 * 7/2018 ............ H04W 84/06

* cited by examiner

*Primary Examiner* — Afshawn M Towfighi
(74) *Attorney, Agent, or Firm* — Young Basile Hanlon & MacFarlane, P.C.

(57) ABSTRACT

Methods and systems for smart reattachment of mobile devices to service provider networks such as WiFi networks. A method for smart reattachment of local wireless service includes scanning, by a mobile device, for access points to establish a local wireless service connection although local wireless service is user switched off on the mobile device, determining, by an application on the mobile device, whether radio frequency metrics for a scanned access point exceeds radio frequency metrics for a cellular service when the cellular service is being used on the mobile device, and automatically switching, by the application and the mobile device, to the local wireless service connection when the radio frequency metrics for the scanned access point exceeds the radio frequency metrics for the cellular service.

17 Claims, 4 Drawing Sheets

METHODS AND APPARATUS FOR SMART WIFI REATTACHMENT

TECHNICAL FIELD

This disclosure relates to communications. More specifically, this disclosure relates to intelligently reattaching service provider provided mobile devices to WiFi or other non-cellular based networks operated by the service provider.

BACKGROUND

The Internet is a global system of interconnected networks that connects devices worldwide. The Internet allows users to share information and communicate with other users. When the Internet first came into the picture, it required physical wires to establish the connection. Over the years, it has evolved, and now we can connect without physical wires and attain higher throughputs. In North America, annually, the market sells tens of millions of computers and billions of smartphones. The sales numbers of smartphones will continue to grow in the years to come due to their diverse application for, but not limited to, personal use, education, billing and account management, restaurant and hotel customer management, theme park user management, retail businesses, and delivery services.

Cable multiple systems operators (MSOs) have made improvements to the infrastructure of their networks over time, which has led to an increase in the number of customers and the network's reliability. However, cable MSOs also lease or license cellular network services from mobile network operators to provide seamless coverage to cable MSO customers, i.e., via using cellular services. That is, when users with cable MSO provided mobile devices use cellular services, this increases the cable MSO costs.

The cable MSOs rely on Internet customers to maximize their profits. The cable MSOs want to keep the customer data traffic within the cable MSO network, e.g., the cable MSO Wi-Fi network, as much as possible. This will help cable MSO customers have faster and more reliable connection, and the cable MSOs don't have to pay wireless operators for use of the wireless operators' network, e.g., the cellular networks. However, Internet users turn off their Wi-Fi on their mobile devices when they are out of their homes or when they experience slower Internet speeds. The Internet users switch to cellular services. The Internet users forget to turn the WiFi services back on. This leads to diminished customer usage and engagement and increased cable MSO costs.

SUMMARY

Described are methods and systems for smart reattachment of mobile devices to service provider networks such as WiFi networks.

In an embodiment, a method for smart reattachment of local wireless service includes scanning, by a mobile device, for access points to establish a local wireless service connection although local wireless service is user switched off on the mobile device, determining, by an application on the mobile device, whether radio frequency metrics for a scanned access point exceeds radio frequency metrics for a cellular service when the cellular service is being used on the mobile device, and automatically switching, by the application and the mobile device, to the local wireless service connection when the radio frequency metrics for the scanned access point exceeds the radio frequency metrics for the cellular service.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
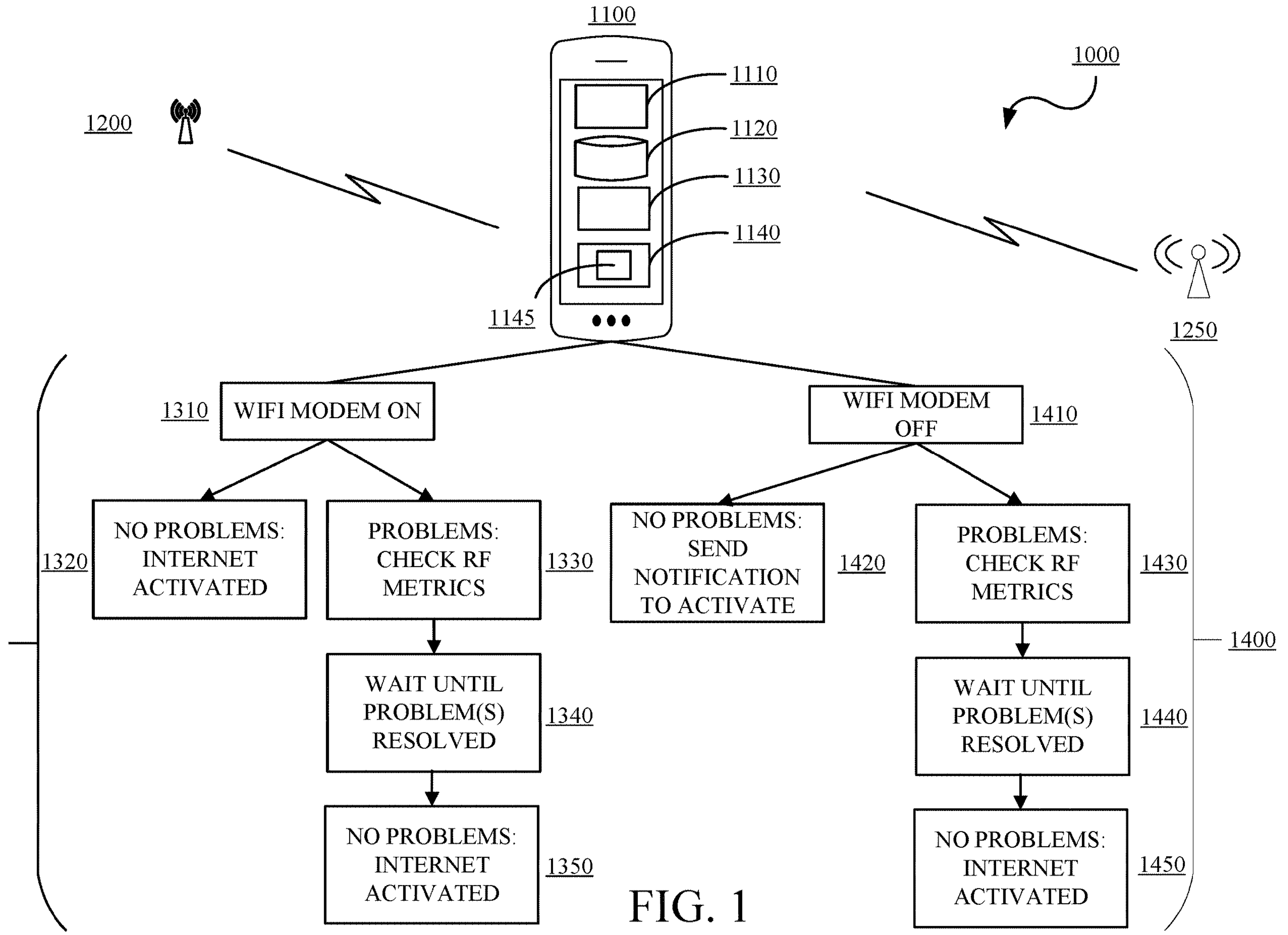
FIG. 1 is a diagram of an example mobile device with a smart reattachment application in accordance with some embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer", "computing device", or "computing platform" includes any unit, or combination of units, in a distributive platform, centralized platform, cloud computing platform, or combinations thereof, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any computer and/or processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks, or activities. For example, applications may perform one or more functions including, but not limited to, telephony, web browsers, media players, navigation, entertainment, data management, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, and methods. Those of ordinary skill may thus recognize that other elements and/or steps may be desirable or necessary to implement the devices, systems, and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein is a method, apparatus, and system for smart reattachment to a service provider provided network such as a WiFi network. In some implementations, a mobile device can include a smart reattachment application or software development kit (SDK) (collectively "application") which enables Wi-Fi modem hardware on the mobile device to performs a Wi-Fi scan even when the Wi-Fi switch is set to OFF or the WiFi is disabled. That is, irrespective of whether the WiFi is on or off and/or enabled or disabled, the application can initiate or execute WiFi scans using the Wi-Fi modem hardware. The Wi-Fi scan shows the list of surrounding networks and/or access points sorted in terms of best coverage. The obtained results are then compared against configured networks and/or access points. If the scanned networks and/or access points were configured previously, then the device connects to the network and/or access point with the best coverage automatically. If the scanned networks and/or access points were not configured previously on the mobile device, the application allows users to enter the password for a desired service set identifier (SSID) and configure it accordingly. Once the network and/or access point connects to the mobile device, instant results of the connected SSID name, timestamp, received signal strength indicator (RSSI) and/or other RF metrics, and link speed are stored. Also, time-configurable memory hold the timestamp, name of the connected SSID, RSSI and/or other RF metrics, and link speed for every unique SSID connected in the past. In this instance, the time configurable memory is a setting controlled by the network, operator, and/or administrator which will allow the memory to retain a record of timestamp, name of the connected SSID, RSSI and/or other RF metrics, and link speed for every unique SSID connected for a defined period of time. That is, a value for the defined period of time determines whether the records are retained for a long time or short time. For instance, the defined period of time controls the frequency of update of the record. In implementations, there is a tradeoff between rate of update and a need for current data.

Once the WiFi session is in session, the user can continue or terminate the Wi-Fi session. In the instance the user decides to continue with the Wi-Fi session, then the session information, such as timestamp, SSID, RSSI and/or other RF metrics, and link speed is updated at a defined period of time basis as part of the current session information. For instance, the defined period of time can be a minute. That is, the session information is updated every minute. In some implementations, the continuation of the WiFi session is a default and/or automatic option requiring no action by the user.

In the instance the user decides to terminate the Wi-Fi session, the user will either use the mobile device without Internet access or will use a cellular network. In the instance the mobile device is being used without Internet access, the application will determine if the mobile device is active or not. If there is no activity on the mobile device, the mobile device is in idle mode and no further actions are taken. If there is activity on the mobile device, the application will send a notification, which will prompt the user to connect to an available configured Wi-Fi network and/or access point.

In the instance the user has switched the mobile device to a cellular network (i.e., by turning off the WiFi service), the application will initially determine from GPS information if the user is roaming (moving) or not based on a defined movement threshold. For instance, the defined movement threshold can differentiate between walking and/or running type activities and moving in or movement due to a vehicle such as a car, airplane, train, and the like. If the user is roaming or moving, the application takes no further action. This prevents ping-ponging between the cellular and WiFi networks when the user is roaming or moving. In the instance the user is below the defined movement threshold, the application on the mobile device can perform passive WiFi scans (i.e., the mobile device will listen for beacon frames from access points) with respect to configured access points. The application on the mobile device will compare RF metrics for one or more configured access points against RF metrics for the cellular service. The application on the mobile device will automatically turn on the WiFi service if the RF metrics for a configured access point meets or exceeds the RF metrics for the cellular service. In some implementations, the cellular service will be turned off, will be secondary in priority to the WiFi service, and/or combinations thereof. The RF metrics for the one or more configured access points are obtained during or with the passive scans.

The devices, applications, and techniques described herein can improve customer base and customer engagement time for cable MSOs and/or a service provider (collectively "service provider"), increase revenue for cable MSOs, enhance customer's Internet usage experience, enhance WiFi offloading while outdoors, and improve battery management system and/or usage.

FIG. 1 is a diagram of an example scenario or environment 1000 in which a mobile device 1100 may be implemented with a smart reattachment application 1110 in accordance with some embodiments of this disclosure. The scenario 1000 may include the mobile device 1100, one or more access points 1200, and one or more base stations 1250. The connections between the mobile device 1100, the one or more access points 1200, and the one or more base stations 1250 may be wired, wireless, or a combination thereof. The number of access points and base stations are illustrative and may vary without departing from the scope of the specification and claims. The scenario 1000 is illustrative and may include additional, fewer, or different components, entities and the like which may be similarly or differently architected without departing from the scope of the specification and claims herein. Moreover, the illustrated devices may perform other functions without departing from the scope of the specification and claims herein.

The mobile device 1100 may be, but is not limited to, end user devices, cellular telephones, Internet Protocol (IP) devices, mobile computers, laptops, handheld computers, PDAs, personal media devices, smartphones, notebooks, notepads, phablets, and the like. In implementations, the mobile device 1100 may include the smart reattachment application 1110, which is connected to a database 1120. In some implementations, the database 1120 may be implemented in a memory and/or other storage device. In some implementations, the mobile device 1100 can include one or more RF radios, modems, and other circuitry (collectively "communication access circuitry"), such as, but is not limited to, communication access circuitry 1130 for cellular service and communication access circuitry 1140 for WiFi service. The mobile device 1100 may have other communication access circuitry such as for BlueTooth services. That is, the mobile device 1100 is a multi-access capable device. In some implementations, the mobile device 1100 is provided by the service provider.

The one or more access point 1200 may provide WiFi coverage or services. The one or more access point 1200 may be owned and/or operated by a service provider. The description herein is with respect to WiFi services but is equally applicable to a local wireless service provided by the service provider, which is owned or operated by the service provider (i.e., no or substantially no costs or fees are provided by the service provider to other commercial providers). That is, the service provider is not licensing or leasing the infrastructure and/or spectrum to provide the local wireless service.

The one or more base stations 1250 may provide cellular coverage and/or services, including small cell cellular coverage for a defined coverage area. The cellular coverage can be provided using spectrum that is operated, owned, licensed, unlicensed, shared, controlled, and/or combinations thereof by a service provider.

Operationally, the mobile device 1100, the smart reattachment application 1110, and the database 1120, as appropriate and applicable, can implement smart reattachment methods and/or techniques as described in this specification which automatically reattaches the mobile device 1100 to the WiFi services or sends a notification to reattach when the WiFi service was disabled or turned off by the user.

Initially, a default condition for the mobile device 1100 is that communication access circuitry for all service types are on or active all the time and scanning. For instance, for the mobile device 1100, the communication access circuitry for the cellular service (e.g., the communication access circuitry 1130), the WiFi service (e.g., the communication access circuitry 1140), and the Bluetooth service will have their respective RF radios on and scanning for appropriate communication or control signals to establish or maintain a respective communication channel via, for example, the base station 1250 and/or the access point 1200, as appropriate. In the instance of WiFi service, a Wi-Fi modem hardware, such as WiFi modem 1145, connects to a WiFi access point, such as the access point 1200, using one or more beacon frames. The WiFi access points and their information, including but not limited to, name, SSID, security settings, RF metrics, and/or signal strength are broadcast through the one or more beacon frames. The communication access circuitry 1140 and/or the WiFi modem 1145 can scan for the beacon frames and send a probe request frame to the desired access point. The probe request frame can include a request for a Basic Service Set Identifier (BSSID) and authentication information. The access point, such as the access point 1200, can respond with a beacon frame. The mobile device 1100, the communication access circuitry 1140 and/or the WiFi modem 1145 can send a connection request frame with its media access control (MAC) address and network name, which the access point 1200 needs to establish a connection. The access point 1200 can authenticate the mobile device 1100 and assign an IP address. This can establish a secure connection using encryption. Once the connection is established, the mobile device 1100 can send and receive data over the WiFi communication channel and/or network via the access point 1200.

At 1310, when the WiFi modem 1145 is enabled (on), the smart reattachment application 1110, the mobile device 1100, and/or the communication access circuitry 1140 can perform WiFi scanning to determine a list of surrounding access points and/or WiFi networks (collectively "scanned WiFi networks") sorted in terms of best coverage. The scanned WiFi networks can be compared against configured WiFI networks stored and/or recorded on the mobile device 1100. If one or more of the scanned WiFi networks were configured previously, then the mobile device 1100 can automatically connect to the already configured scanned WiFi network with the best coverage. If one or more of the scanned WiFi networks were not configured previously on the device, the smart reattachment application 1110 and/or the mobile device 1100 can enable a user to enter the password for a desired SSID (i.e., a scanned WiFi network) and configure, accordingly. Once the scanned WiFi network connects to the mobile device 1100, instant results of the connected SSID name, timestamp, RSSI, and link speed are stored on the mobile device 1100 in the database 1120. The database 1120 can also store the timestamp, name of the connected SSID, RF metrics or RSSI, and link speed for every unique SSID connected in the past. Once the WiFi channel is established, the smart reattachment application 1110, the mobile device 1100, and/or the communication access circuitry 1140 can continue WiFi services and scanning to maintain the best WiFi connection.

At 1320, assuming no issues, Internet access is maintained using the WiFi services and connection. At 1330, the smart reattachment application 1110, the mobile device 1100, and/or the communication access circuitry 1140 may determine an issue with the WiFi connection. At 1340, in some implementations, in this instance, the smart reattachment application 1110, the mobile device 1100, the communication access circuitry 1140, and/or the communication access circuitry 1130 may temporarily switch to or use the cellular service to maintain Internet access while the issues with the WiFi services and/or connection is resolved. At 1350, once the issue is resolved, the smart reattachment application 1110, the mobile device 1100, the communication access circuitry 1140, and/or the communication access circuitry 1130 can automatically return to or turn on WiFi services and/or connection for the Internet access.

At 1410, in the instance a user turns off the WiFi service on the mobile device 1100, the WiFi modem 1145 is still active and running in the background. The smart reattachment application 1110 enables the mobile device 1100 and/or the communication access circuitry 1140 to perform the scanning (as described above) irrespective of whether the WiFi service is enabled (on) (technique, logic, or path 1300) or disabled (off) (technique, logic, or path 1400). This, in turn, enables the smart reattachment application 1110, the mobile device 1100 and/or the communication access circuitry 1140 to provide a notice to reattach or automatically reattach to an access point under certain conditions as described herein in the specification. At 1420, the smart reattachment application 1110, the mobile device 1100, and/or the communication access circuitry 1140 may determine that there are no issues with the WiFi access, services, and/or connection for the Internet access. The smart reattachment application 1110, the mobile device 1100, and/or the communication access circuitry 1140 can send a notification to the user that WiFi access is available. For instance, the user may have turned off WiFi due to non-Internet based activity, conserve power, and/or other like reasons. Therefore, automatically reattaching the WiFI services would be counterproductive. However, providing a notice to reattach may be considered as a thoughtful reminder and not as intrusive.

At 1430, the smart reattachment application 1110, the mobile device 1100, and/or the communication access circuitry 1140 may determine that there are issues with the WiFi access, services and/or connection for the Internet access. At 1440, the smart reattachment application 1110, the mobile device 1100, the communication access circuitry 1140, and/or the communication access circuitry 1130 may maintain the status of the mobile device 1100 in the current configuration while the issues with the WiFi services and/or connection is resolved. At 1450, once the issue is resolved, the smart reattachment application 1110, the mobile device 1100, the communication access circuitry 1140, and/or the communication access circuitry 1130 can automatically turn on the WiFi services and/or connection for the Internet access. By automatically switching back, the service provider optimizes the use of the WiFi services and reduces the costs associated with using the cellular services.

Figure 2:
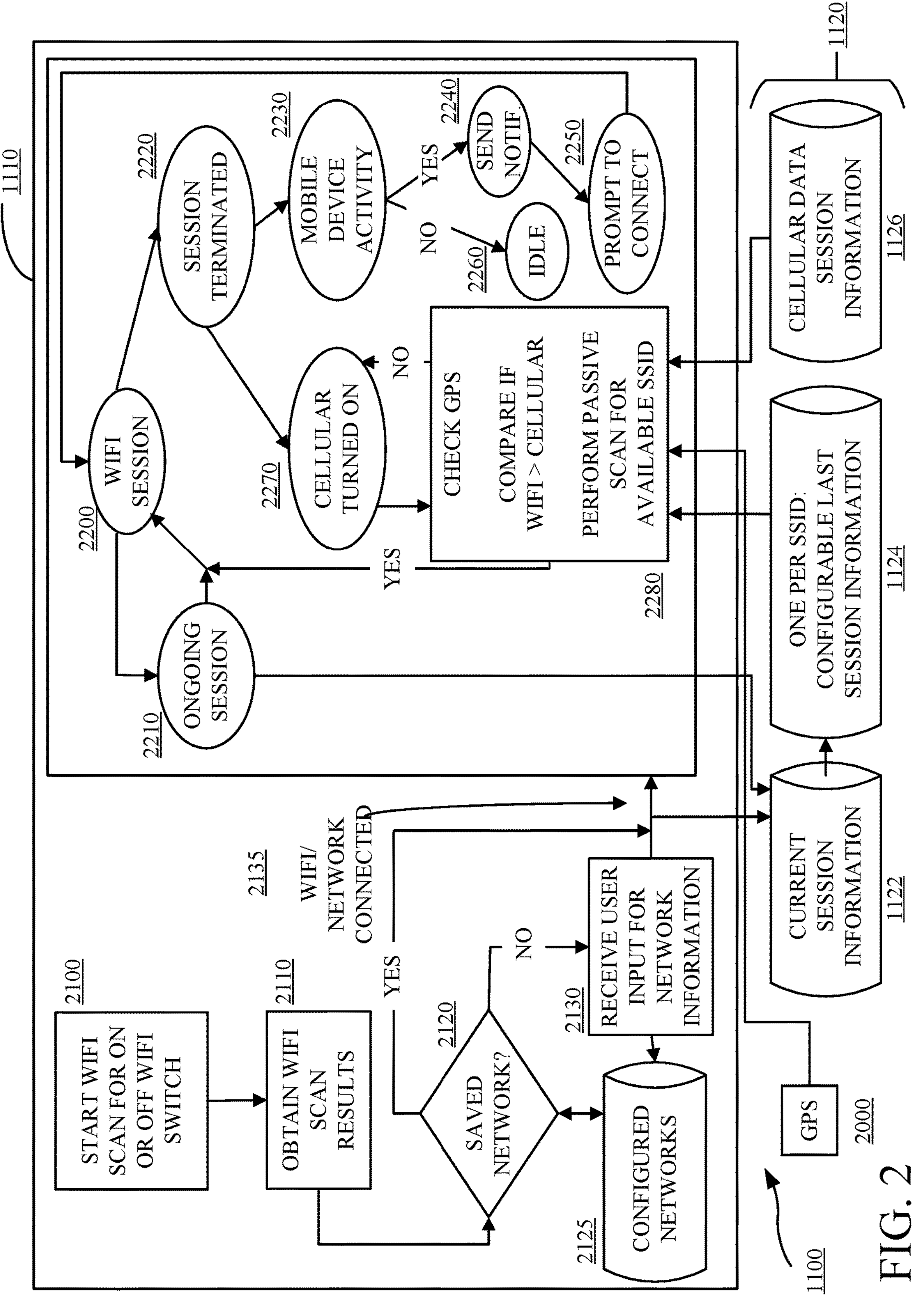
FIG. 2 is a diagram of an example smart reattachment application in accordance with some embodiments of this disclosure.

FIG. 2 is a diagram of an example of the mobile device 1100 of FIG. 1 in accordance with some embodiments of this disclosure. The mobile device 1100 includes the smart reattachment application 1110, the database 1120, and a GPS device 2000. In some implementations, the database 1120 may include a current session information database 1122, a configurable last session information per SSID database 1124, and a cellular data session information 1126. The mobile device 1100 is illustrative and may include additional, fewer, or different components, entities and the like which may be similarly or differently architected without departing from the scope of the specification and claims herein. Moreover, the illustrated device may perform other functions without departing from the scope of the specification and claims herein.

Operationally, at 2100 and 2110, the mobile device 1100 and/or the smart reattachment application 1110 will scan for WiFi access points irrespective of whether the WiFi service is switched on or off and obtain WiFi scan results, respectively. For instance, for an Android based mobile device, a command or call may include WifiManager.startScan( ) using an ACTION REQUEST SCAN ALWAYS AVAILABLE variable to request a scan for access points and to show system activity that allows the user to enable scans to be available even with Wi-Fi turned off. The command WifiManager.getConfiguredNetworks( ) may be used to return the results of the latest access point scan, which may include SSID, level (RSSI), and the like.

At 2120, the mobile device 1100 and/or the smart reattachment application 1110 can determine if access points found in the scanning are already configured in a configured networks database 2125. For the Android mobile device, the command WifiManager.getConfiguredNetworks( ) may return a list of all the networks configured for the current user. If yes, a WiFi connection 2135 is automatically established. If the obtained access point is not in the configured networks database 2125, at 2130, the mobile device 1100 and/or the smart reattachment application 1110 can receive input from a user to configure the obtained access point (e.g., a password) and store the configuration information in the configured networks database 2125. After receiving the configuration information, the WiFi connection 2135 is established. The established WiFi connection information is stored in the current session information database 1122.

At 2200, once the WiFi connection 2135 is established, the mobile device 1100 and/or the smart reattachment application 1110 can determine whether the WiFi connection

2135 is still in session or terminated. For the Android mobile device, the command may be NetworkCapabilities.getNetworkCapabilities( ).hasTransport(Network Capabilities. TRANSPORT_WIFI), which obtains information from which the application can determine if Wi-Fi is the medium of transport being used.

At 2210, if the WiFi connection 2135 is still in session, updated session information is stored in the current session information database 1122. This may cycle as long as the WiFi connection 2135 or current session is connected. For the Android mobile device, the command may be WifiManager.isWifiEnabled( ), which returns whether the WiFi is enabled or disabled.

At 2220, the mobile device 1100 and/or the smart reattachment application 1110 can determine why the WiFi connection 2135 has been terminated. For the Android mobile device, the command may be WifiManager.getWifiState( ), which obtains the WiFi enabled state.

At 2230, the mobile device 1100 and/or the smart reattachment application 1110 can determine if there is any activity on the mobile device 1100. For the Android mobile device, the command may be PowerManager.isInteractive( ), which returns true if the device is in an interactive state. If there is no activity on the mobile device 1100, then the mobile device 1100 is in idle mode 2260 and no further action is taken. If there is activity on the mobile device 1100, then a notification is generated and sent 2240, which in turn generates a prompt to connect 2250 to the user. For instance, the activity can be reading an ebook, watching a downloaded video, or actions that do not require an Internet connection.

At 2270, the mobile device 1100 and/or the smart reattachment application 1110 can determine if cellular service is turned on. For the Android mobile device, the command may be NetworkCapabilities.getNetworkCapabilities( ).hasTransport (NetworkCapabilities.TRANSPORT_CELLULAR), which can be used to determine if the transport used is cellular. At 2280, if cellular service is turned on, the mobile device 1100 and/or the smart reattachment application 1110 can check GPS data from the GPS device 2000 to determine if the mobile device 1100 is moving. For the Android mobile device, the command may be Manifest.permission.ACCESS_FINE_LOCATION, which allows the application to determine a location from the available location providers, including the GPS device 2000 as well as WiFi and cellular data. In some implementations, the GPS data can be compared against a defined threshold to differentiate movement generated from walking/running and movement generated from riding in a vehicle. If the GPS data meets or exceeds the defined threshold, then the mobile device 1100 and no further action is taken. The mobile device 1100 continues using the cellular service. This can prevent constant or frequent (or substantially thereof) switching between cellular service and WiFi service while the mobile device 1100 is moving.

If the GPS data falls below the defined threshold, then the mobile device 1100 and/or the smart reattachment application 1110 can compare RF metrics data between the cellular service (which may be obtained in real-time or from the cellular data session information database 1126) and the WiFi service. The mobile device 1100 and/or the smart reattachment application 1110 can be, on a defined interval, scanning for access points and obtaining RF metrics data. The results of the scan be used in cooperation with the configurable last session information per SSID database 1124 to determine which RF metrics data to use for the comparison. If the cellular service RF metrics data exceeds the WiFi service RF metrics data, then the mobile device 1100 continues using the cellular service. If the WiFi service RF metrics data exceeds the cellular service RF metrics data, then the mobile device 1100 automatically switches to or turns on the WiFi service. In some implementations, the WiFi service RF metrics data has to exceed the cellular service RF metrics data by a defined level. This can prevent constant or frequent (or substantially thereof) switching between the WiFi service and the cellular service unless there is a defined amount of service improvement as set by the defined level.

Figure 3:
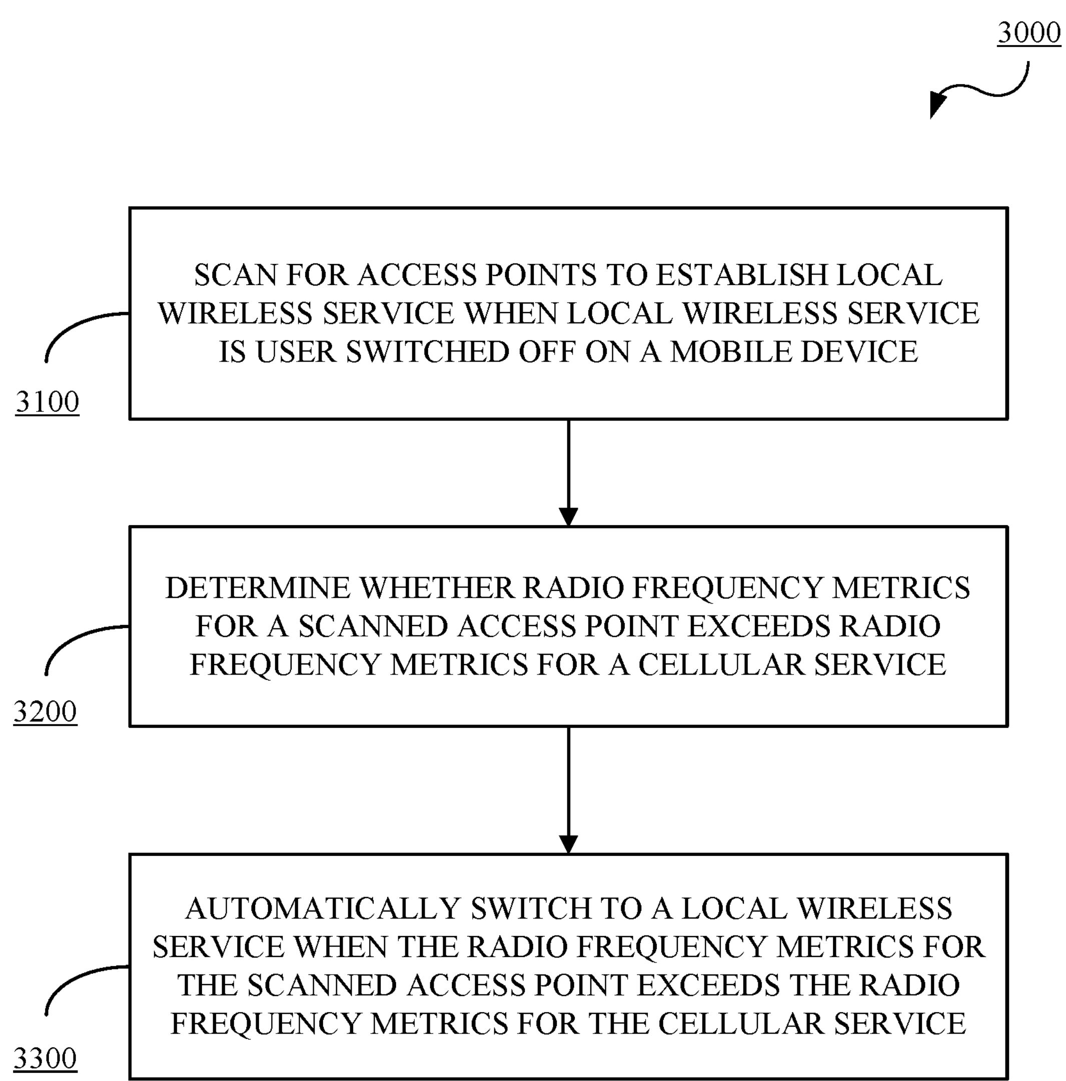
FIG. 3 is a flowchart of an example method for smart reattachment in accordance with some embodiments of this disclosure.

FIG. 3 is a flowchart of an example method 3000 for smart reattachment in accordance with some embodiments of this disclosure, which is discussed with reference also to FIGS. 1 and 2. The method 3000 includes: scanning 3100 for access points to establish local wireless service when local wireless service is user switched off on a mobile device; determining 3200 whether radio frequency metrics for a scanned access point exceeds radio frequency metrics for a cellular service; and automatically switching 3300 to a local wireless service when the radio frequency metrics for the scanned access point exceeds the radio frequency metrics for the cellular service. The method 3000 can be implemented, for example, in the mobile device 1100 and/or components therein, the smart reattachment application 1110, the database 1120 and/or components therein, and a device 4000 and components therein, as appropriate and applicable.

The method includes scanning 3100 for access points to establish local wireless service when local wireless service is user switched off on a mobile device. An application on a mobile device enables the mobile device to scan for local wireless service, such as WiFi, even when a user of the mobile device turns off the local wireless service on the mobile device. The local wireless service modem is enabled to scan for the access points. For instance, SDK calls may be used to enable scanning, obtaining scanning results, turning on WiFi service, getting GPS data, and performing other steps as described herein. The mobile device and the local wireless service are provided by a same service provider.

The method includes determining 3200 whether radio frequency metrics for a scanned access point exceeds radio frequency metrics for a cellular service. The application can attempt to determine why the local wireless service was turned off based on whether there is activity on the mobile device not requiring Internet access, whether cellular service is turned on, and/or combinations thereof. If the cellular service is on, the application can determine if the mobile device is moving such that maintaining a local wireless service connection would be problematic as described herein. If an access point is found during the scanning, the access point was previously configured on the mobile device, and the mobile device is not moving sufficient to cause connection issues, the application can compare RF metrics data between the local wireless service connection and the cellular service connection. If the cellular service is off, the application can check for activity on mobile device. If the mobile device is idle, no further actions are taken. If the mobile device shows non-Internet based activity, the application sends a notification to prompt the user that the WiFi service is off and can be turned on, if necessary.

The method includes automatically switching 3300 to a local wireless service when the radio frequency metrics for the scanned access point exceeds the radio frequency metrics for the cellular service. The application can immediately and automatically turn on the local wireless service when the RF metrics for the local wireless service connection are better than the RF metrics for the cellular service connection.

Figure 4:
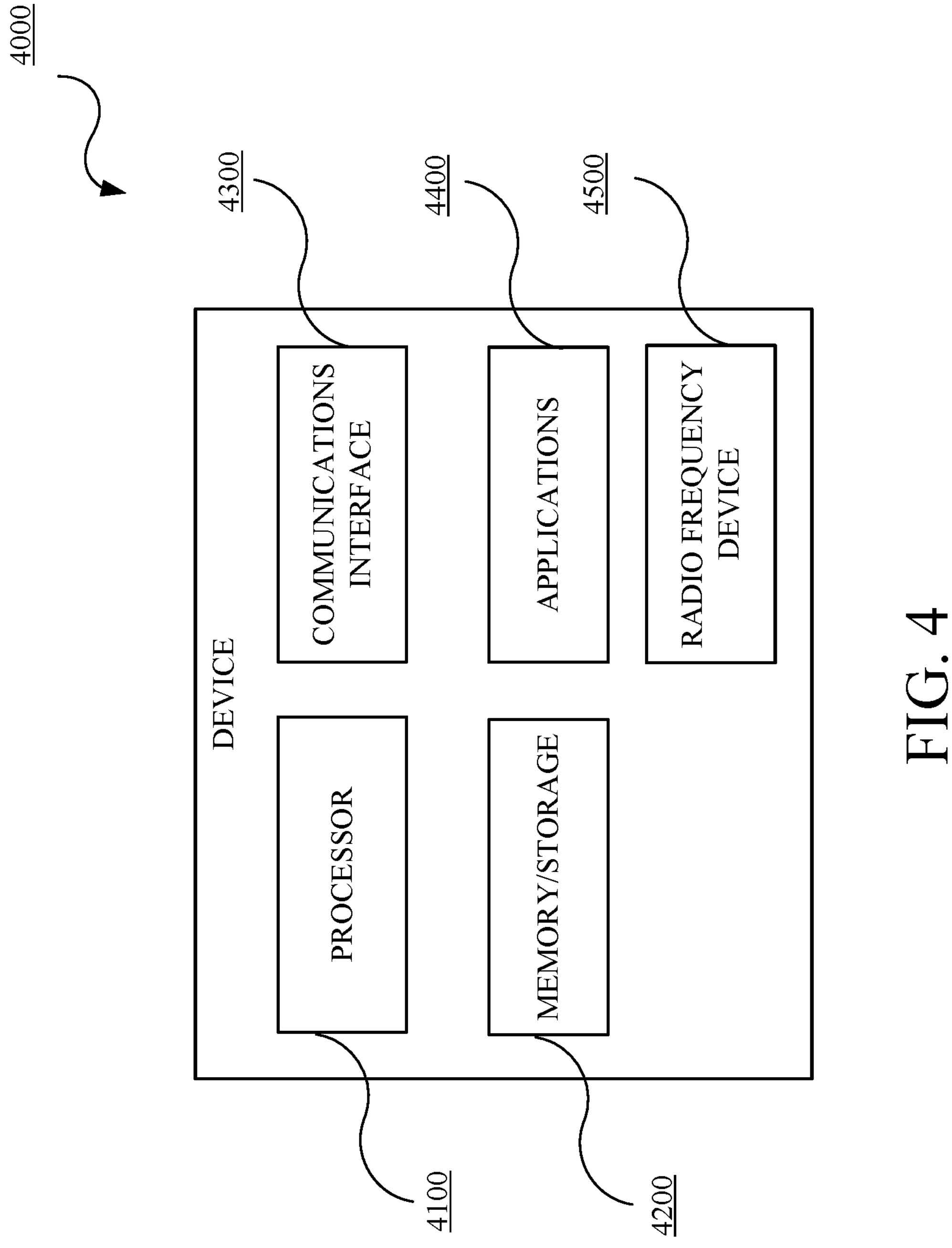
FIG. 4 is a block diagram of an example device in accordance with some embodiments of this disclosure.

FIG. 4 is a block diagram of an example device 4000 in accordance with some embodiments of this disclosure. The device 4000 may include, but is not limited to, a processor 4100, a memory/storage 4200, a communication interface 4300, applications 4400, and a RF device 4500. The device 4000 may include or implement, for example, the mobile device 1100. In implementations, the memory/storage 4200 may implement the database 1120, the current session information database 1122, the configurable last session information per SSID database 1124, the cellular data session information 1126, and/or the configured networks database 2125. The applications 4400 may include the smart reattachment application 1110. The techniques or methods described herein may be stored in the memory/storage 4200 and executed by the processor 4100 in cooperation with the memory/storage 4200, the communications interface 4300, the applications 4400, and the RF device 4500, as appropriate. The device 4000 may include other elements which may be desirable or necessary to implement the devices, systems, methods described herein. However, because such elements and steps are well known in the art, and because they do not facilitate a better understanding of the disclosed embodiments, a discussion of such elements and steps may not be provided herein.

Described herein are methods, systems, applications, and devices for smart reattachment. In some implementations, a method for smart reattachment of local wireless service includes scanning, by a mobile device, for access points to establish a local wireless service connection although local wireless service is user switched off on the mobile device, determining, by an application on the mobile device, whether radio frequency metrics for a scanned access point exceeds radio frequency metrics for a cellular service when the cellular service is being used on the mobile device, and automatically switching, by the application and the mobile device, to the local wireless service connection when the radio frequency metrics for the scanned access point exceeds the radio frequency metrics for the cellular service.

In some implementations, the method further includes enabling, by the application, a local wireless service modem to scan for the access points when the local wireless service is user switched off on the mobile device. In some implementations, the method further includes determining, by the application, why the local wireless service is turned off on the mobile device. In some implementations, the method further includes determining, by the application, whether the mobile device is using the cellular service. In some implementations, the method further includes determining, by the application, whether the mobile device is moving when mobile device is using the cellular service. In some implementations, the method further includes foregoing, by the application, the determining whether radio frequency metrics for a scanned access point exceeds radio frequency metrics for a cellular service when the cellular service is being used on the mobile device when the mobile device is moving. In some implementations, the method further includes determining, by the application, whether there is activity on the mobile device when the cellular service is absent on the mobile device. In some implementations, the method further includes sending, by the application, a notification to the user that the local wireless service on the mobile device can be turned on when there is activity on the mobile device. In some implementations, the automatically switching is performed when the radio frequency metrics for the scanned access point exceeds the radio frequency metrics for the cellular service by a defined level.

Described herein are methods, systems, applications, and devices for smart reattachment. In some implementations, a mobile device includes a smart reattach application, a memory configured to store a database, and a processor connected to the memory and running the smart reattach application. The processor configured to determine access points with which to establish a WiFi connection although WiFi service is user switched off on the mobile device, compare whether radio frequency metrics for a scanned access point with radio frequency metrics for a cellular service when the cellular service is active on the mobile device, and automatically use the WiFi connection when the radio frequency metrics for the scanned access point exceeds the radio frequency metrics for the cellular service.

In some implementations, the smart reattach application is configured to enable a WiFi modem to perform scans to locate the access points although the WiFi service is user switched off on the mobile device. In some implementations, the smart reattach application is configured to determine why the WiFi service is user switched off on the mobile device. In some implementations, the smart reattach application is configured to determine whether the mobile device is using the cellular service, determine whether the mobile device is moving, and perform the compare when movement of the mobile device is below a defined threshold. In some implementations, the smart reattach application is configured to determine whether there is activity on the mobile device when the cellular service is absent on the mobile device, and prompt the user that the WiFi service on the mobile device can be turned on when there is activity on the mobile device. In some implementations, the smart reattach application is configured to automatically use the WiFi connection when the radio frequency metrics for the WiFi connection exceeds the radio frequency metrics for the cellular service by a defined amount. In some implementations, the mobile device is provided by a service provider and the WiFi connection is owned by the service provider.

Described herein are methods, systems, applications, and devices for smart reattachment. In some implementations, a method for smart reattachment of local wireless service includes scanning, by a wireless device, for access points although local wireless service is disabled on the wireless device by a user, determining, by an application on the wireless device, whether cellular service is active on the wireless device, comparing, by the application, radio frequency metrics of a scanned access point with radio frequency metrics of the cellular service, and automatically enabling, by the application and the wireless device, the local wireless service when the radio frequency metrics for the scanned access point exceeds the radio frequency metrics for the cellular service.

In some implementations, the method further includes enabling, by the application, a local wireless service modem to scan for the access points when the local wireless service is disabled on the wireless device by the user. In some implementations, the method further includes determining, by the application, whether movement of the wireless device exceeds a defined threshold. In some implementations, the method further includes foregoing, by the application, the comparing when the movement of the wireless device exceeds the defined threshold.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for smart reattachment of local wireless service, the method comprising:

scanning, by a mobile device, for access points to establish a local wireless service connection although local wireless service is user switched off on the mobile device;

determining, by an application, whether there is activity on the mobile device when cellular service is absent on the mobile device;

sending, by the application, a notification to the user that the local wireless service on the mobile device can be turned on when there is activity on the mobile device;

determining, by the application on the mobile device, whether radio frequency metrics for a scanned access point exceeds radio frequency metrics for a cellular service when the cellular service is being used on the mobile device; and automatically switching, by the application and the mobile device, to the local wireless service connection when the radio frequency metrics for the scanned access point exceeds the radio frequency metrics for the cellular service.

2. The method of claim 1, the method further comprising: enabling, by the application, a local wireless service modem to scan for the access points when the local wireless service is user switched off on the mobile device.

3. The method of claim 1, the method further comprising: determining, by the application, why the local wireless service is turned off on the mobile device.

4. The method of claim 1, the method further comprising: determining, by the application, whether the mobile device is using the cellular service.

5. The method of claim 4, the method further comprising: determining, by the application, whether the mobile device is moving when mobile device is using the cellular service.

6. The method of claim 5, the method further comprising: foregoing, by the application, the determining whether radio frequency metrics for a scanned access point exceeds radio frequency metrics for a cellular service when the cellular service is being used on the mobile device when the mobile device is moving.

7. The method of claim 1, wherein the automatically switching is performed when the radio frequency metrics for the scanned access point exceeds the radio frequency metrics for the cellular service by a defined level.

8. A mobile device comprising:

a smart reattach application;

a memory configured to store a database; and a processor connected to the memory and running the smart reattach application, the processor configured to:

determine access points with which to establish a WiFi connection although WiFi service is user switched off on the mobile device;

determine whether there is activity on the mobile device when cellular service is absent on the mobile device;

prompt the user that the WiFi service on the mobile device can be turned on when there is activity on the mobile device;

compare whether radio frequency metrics for a scanned access point with radio frequency metrics for a cellular service when the cellular service is active on the mobile device; and automatically use the WiFi connection when the radio frequency metrics for the scanned access point exceeds the radio frequency metrics for the cellular service.

9. The mobile device of claim 8, wherein the smart reattach application is configured to enable a WiFi modem to perform scans to locate the access points although the WiFi service is user switched off on the mobile device.

10. The mobile device of claim 8, wherein the smart reattach application is configured to determine why the WiFi service is user switched off on the mobile device.

11. The mobile device of claim 8, the smart reattach application is configured to:

determine whether the mobile device is using the cellular service;

determine whether the mobile device is moving; and perform the compare when movement of the mobile device is below a defined threshold.

12. The mobile device of claim 8, wherein the smart reattach application is configured to automatically use the WiFi connection when the radio frequency metrics for the WiFi connection exceeds the radio frequency metrics for the cellular service by a defined amount.

13. The mobile device of claim 8, wherein the mobile device is provided by a service provider and the WiFi connection is owned by the service provider.

14. A method for smart reattachment of local wireless service, the method comprising:

scanning, by a wireless device, for access points although local wireless service is disabled on the wireless device by a user;

determining, by an application, whether there is activity on the wireless device when cellular service is absent on the wireless device;

sending, by the application, a notification to the user that the local wireless service on the wireless device can be turned on when there is activity on the wireless device;

determining, by the application on the wireless device, whether cellular service is active on the wireless device;

comparing, by the application, radio frequency metrics of a scanned access point with radio frequency metrics of the cellular service; and automatically enabling, by the application and the wireless device, the local wireless service when the radio frequency metrics for the scanned access point exceeds the radio frequency metrics for the cellular service.

15. The method of claim 14, the method further comprising:

enabling, by the application, a local wireless service modem to scan for the access points when the local wireless service is disabled on the wireless device by the user.

16. The method of claim 14, the method further comprising:

determining, by the application, whether movement of the wireless device exceeds a defined threshold.

17. The method of claim 16, the method further comprising:

foregoing, by the application, the comparing when the movement of the wireless device exceeds the defined threshold.

* * * * *